Sept. 17, 1963 L. BRADT ETAL 3,103,895
TOW TRUCK SYSTEM
Filed Jan. 29, 1962 3 Sheets-Sheet 1
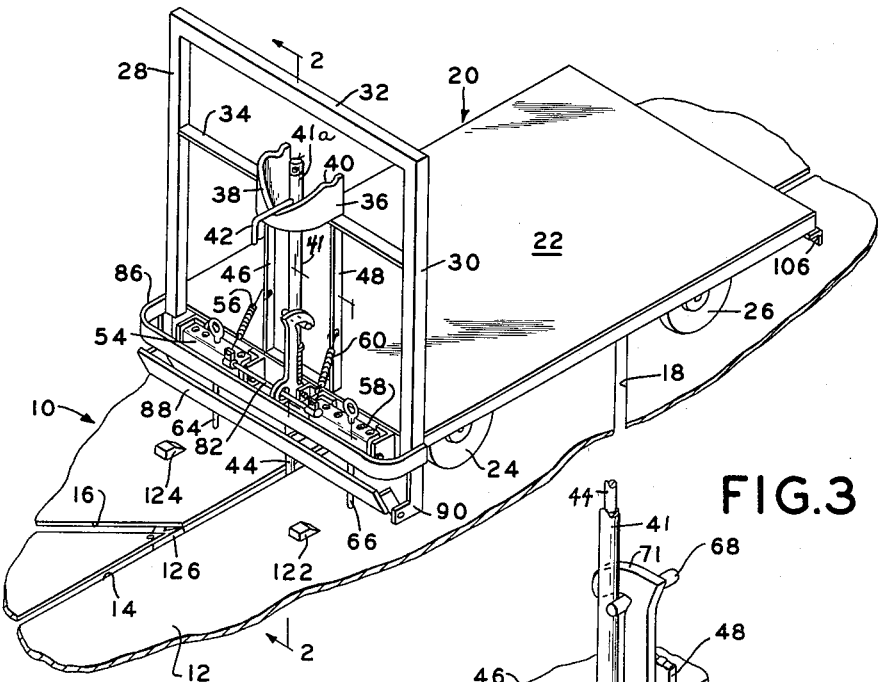
FIG.1
FIG.3
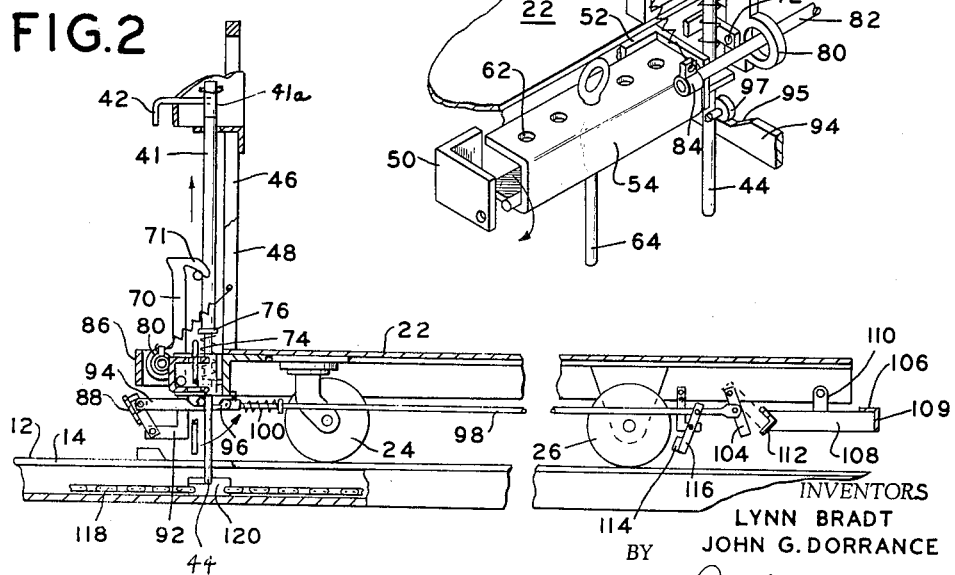
FIG.2
INVENTORS
LYNN BRADT
JOHN G. DORRANCE
BY Arthur H. Seidel
ATTORNEY

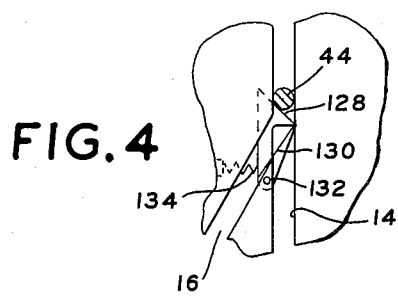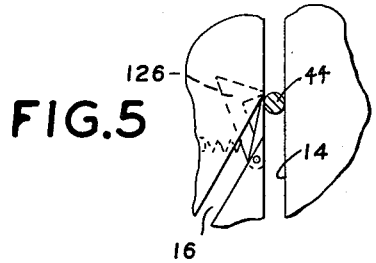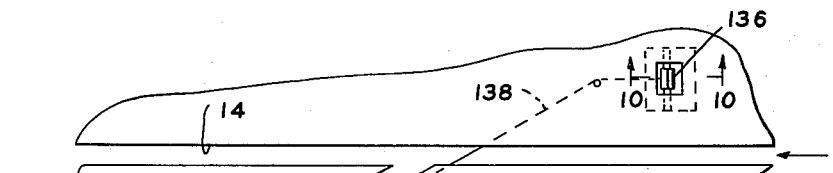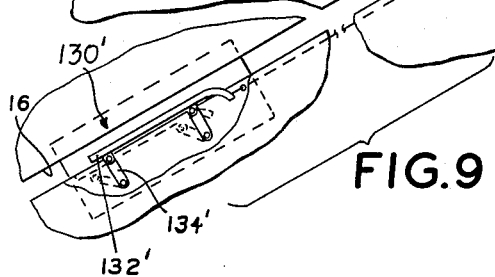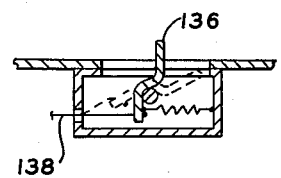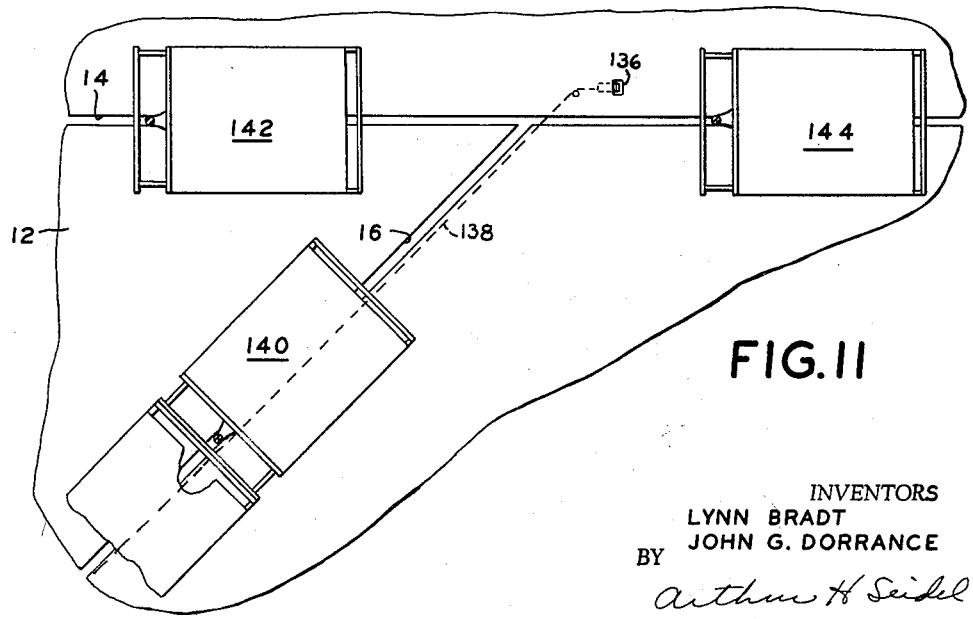

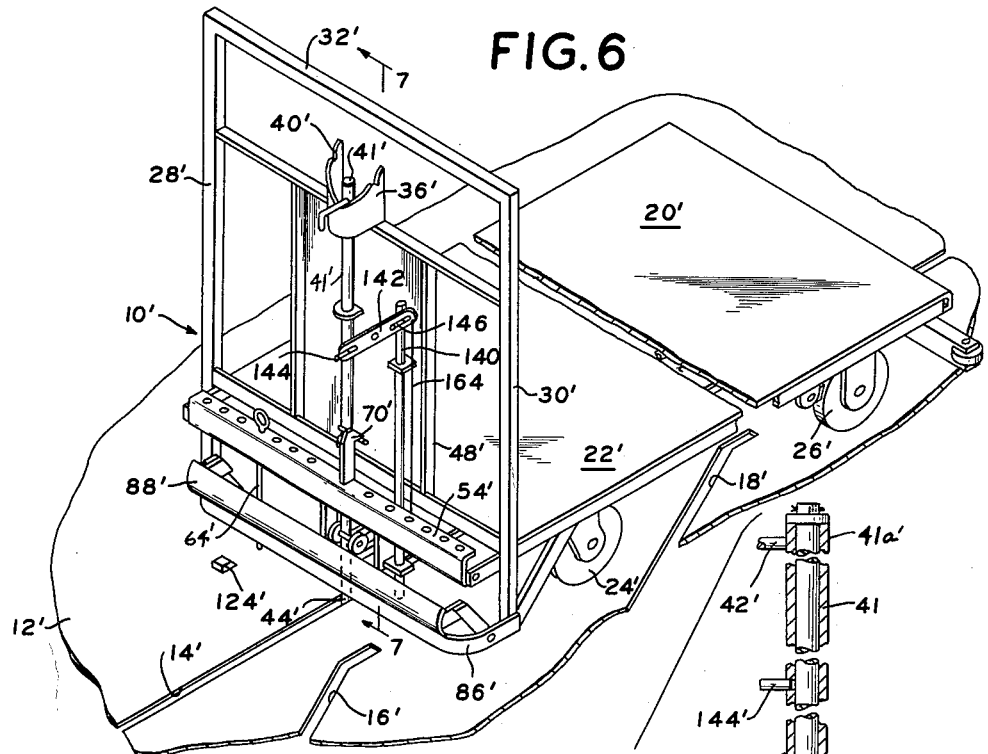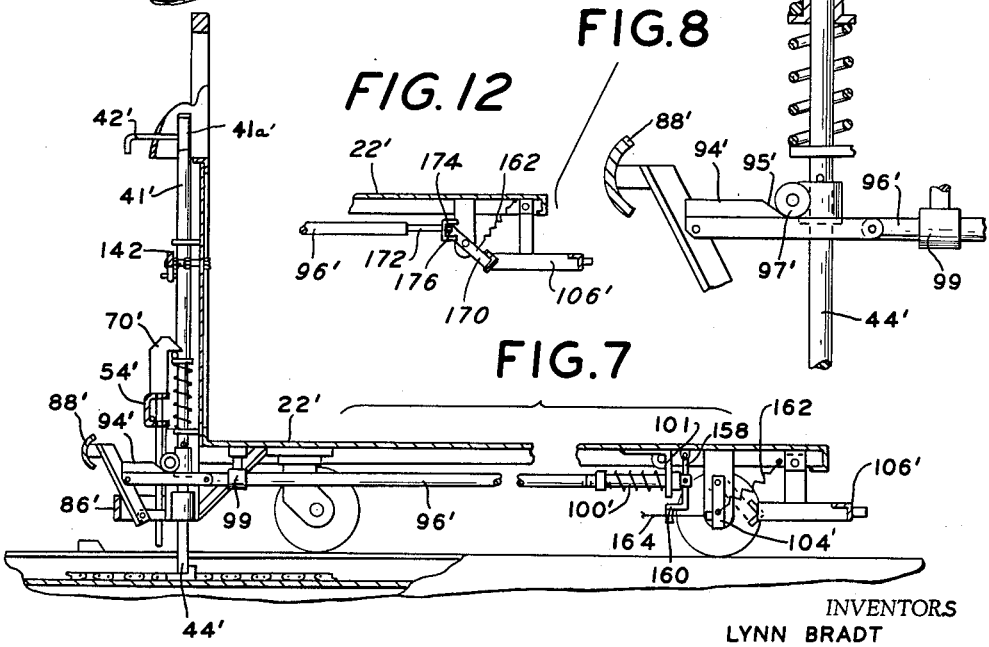

United States Patent Office 3,103,895
Patented Sept. 17, 1963

3,103,895
TOW TRUCK SYSTEM
Lynn Bradt, Easton, Pa., and John G. Dorrance, Phillipsburg, N.J., assignors to SI Handling Systems Inc., Phillipsburg, N.J., a corporation of Pennsylvania
Filed Jan. 29, 1962, Ser. No. 169,270
21 Claims. (Cl. 104—88)

This invention relates to a tow truck system. More particularly, this invention relates to a tow truck system wherein a truck is towed by means of a tow pin extending through a main slot in or above a floor so that the truck may be automatically directed to a pre-selected slot.

In the tow truck system of the present invention, the tow pin on a truck extends through a main slot for engagement with a tow line dog which causes the truck to move along the main slot. In one embodiment of the present invention, a plurality of shunt slots intersect the main slot at spaced points therealong. In another embodiment of the present invention, the shunt slots do not intersect the main slot, but extend in a direction away from the main slot at spaced points therealong. Means are provided to interrupt the propelling effect caused by the engagement between the tow pin and the dog and thereafter switch the truck into a preselected area having a shunt slot communicating therewith.

A tow truck system is particularly adaptable for use in warehouses, freight terminals, and the like. The area to which the shunt slot extends may be a loading, an unloading, or a storage area. The function of the area is not important, but its location relative to the main slot is important. The tow line having dogs fixedly secured thereto at spaced points therealong may be disposed beneath the main slot in the floor of a building or the like. Alternatively, the tow line may be disposed in a plane above the main slot. When the main slot is disposed in the floor, metallic flanged elements define the main slot and shunt slots and are generally flush with the floor.

The trucks of the present invention are provided with a spring biased vertically disposed tow pin in a front portion of the trucks. A selectively movable means is provided for opposing the biasing effect of the spring means on the tow pin. The trucks of the present invention are provided with a pushing bumper and an accumulation bumper on a front portion thereof. Also, such trucks are provided with a rear bumper capable of being converted into an accumulation bumper in response to movement of the front accumulation bumper.

The truck of the present invention is provided with means including a trip rod or a pair of trip rods on opposite sides of the tow pin. When each trip rod of the pair is actuated simultaneously, the tow pin is caused to move vertically out of engagement with the dog on the tow line. Thereafter, the truck may be directed from the main slot to a shunt slot. If only one trip rod is actuated, the tow pin does not move out of engagement with the dog. Means are provided for varying the spacing of the trip rod on each side of the tow pin so that the number of shunt slots with which the truck may be utilized is the product of the number of trip rod spaces on one side of the tow pin and the number of trip rod spaces on the other side of the tow pin.

The front accumulation bumper of the trucks of the present invention is interconnected with a brake means so that the rear wheels may be braked in response to movement of said front accumulation bumper. Also, the front accumulation bumper is structurally interrelated with a means which causes vertical movement of the tow pin in response to movement of said front accumulation bumper.

It is an object of the present invention to provide a novel tow truck system.

It is another object of the present invention to provide a tow truck system with coordinating switching means whereby a truck moving along a main slot may be automatically switched for movement along a pre-selected shunt slot.

It is another object of the present invention to provide a tow truck having a movable rear bumper selectively capable of being rendered immobile in response to movement of a front accumulation bumper.

It is another object of the present invention to provide a tow truck system wherein a tow truck is provided with a rear bumper capable of being converted into an accumulation bumper.

It is still another object of the present invention to provide a tow truck system having a truck wherein an accumulation bumper on the truck is adapted to apply brakes on wheels of said truck and enable a rear bumper to have a pushing disposition.

It is still another object of the present invention to provide a tow truck system wherein the tow truck is provided with a reciprocably disposed spring biased tow pin having its lower end in abutting contact with a dog on a tow line, and where means are provided for releasing opposition to the spring bias so that said tow pin may be biased to a position wherein its lowermost end is free from engagement with a dog on a tow line.

Other objects will appear hereinafter.

For the purpose of illustrating the invention there is shown in the drawings forms which are presently preferred; it being understood, however, that this invention is not limited to the precise arrangements and instrumentalities shown.

FIGURE 1 is a partial perspective view of the tow truck system of the present invention.

FIGURE 2 is a transverse sectional view taken along the lines 2—2 in FIGURE 1.

FIGURE 3 is a partial perspective view, on an enlarged scale, of a portion of the tow truck shown in FIGURE 1.

FIGURE 4 is a top plan view of a switch plate controlling the intersection of a main slot and a shunt slot.

FIGURE 5 is a top plan view of the switch plate shown in FIGURE 4, illustrating one operative disposition thereof.

FIGURE 6 is a partial perspective view of the tow truck system of the present invention, illustrating another embodiment thereof.

FIGURE 7 is a longitudinal sectional view taken along the lines 7—7 in FIGURE 6.

FIGURE 8 is an enlarged elevation view, partly in section, of a portion of the truck illustrated in FIGURE 7.

FIGURE 9 is a plan view of an overload control device for a shunt slot.

FIGURE 10 is a view taken along the lines 10—10 in FIGURE 9.

FIGURE 11 is a diagrammatic view illustrating in operation of the overload control device.

FIGURE 12 is a view similar to FIGURE 7 but showing only the rear of another embodiment.

Referring to the drawing in detail, wherein like numerals indicate like elements, there is shown in FIGURE 1 a tow truck system designated generally as 10.

The tow truck system 10 includes a floor 12 having a main slot 14. A plurality of shunt slots intersect the main slot 14 at spaced points therealong. Thus, the main slot 14 is intersected by shunt slot 16 and shunt slot 18. While only two shunt slots are illustrated, it will be appreciated that a greater number of shunt slots are provided when practicing the present invention.

A truck designated generally as 20 is supported for rolling engagement on the floor 12. The truck 20 includes a generally horizontally disposed base 22 supported by a pair of front wheels 24 and a pair of rear wheels 26.

The base 22 supports a pair of substantially parallel upright standards 28 and 30 at a front end portion thereof. The standards 28 and 30 are interconnected at their uppermost ends by a crosspiece 32. An angle iron crossbar 34 extends between the standards 28 and 30. A generally circular latch plate 36 is supported by the crossbar 34. The latch plate 36 is provided with a V-shaped cam surface 38 terminating in notches 40 at the uppermost ends thereof. A handle 42 is selectively disposed in the notches 40 or at the apex of the cam surface 38.

The handle 42 is integrally connected to a vertically disposed reciprocally mounted tube 41a concentric with and in abutting contact with a tube 41. A tow pin 44 is reciprocably and rotatably disposed within the tube 41. A pair of spaced upright arms 46 and 48 extend between the crossbar 34 and the base 22 on opposite sides of the tow pin 44.

A pair of L-shaped brackets 50 and 52 are fixedly secured in any convenient manner to a front edge of the base 22. A trip rod support member 54 is rotatably mounted and supported by the brackets 50 and 52. The trip rod support member 54 is C-shaped in transverse cross section as shown more clearly by FIGURES 2 and 3. A spring 56 extending between the member 54 and the arm 46 maintains the member 54 in a horizontal disposition as illustrated in FIGURES 2 and 3.

A trip rod support member 58, identical with member 54, is rotatably supported by a pair of brackets on the opposite side of the tow pin 44. A spring 60 extending between the arm 48 and the member 58 maintains said member 58 in a horizontal disposition. Each of the members 54 and 58 are provided with a plurality of aligned holes at spaced points therealong. While only five such holes are shown in the member 54 in FIGURE 3, the number of such holes may be increased as desired. A trip rod 64 extends through a pair of aligned holes on the member 54. A trip rod 66 extends through a pair of aligned holes on the member 58.

A pin 68 is fixedly secured to the tube 41 and extends in a direction substantially perpendicular to the longitudinal axis of the tow pin 44. An arm 70 is rotatably supported by a pin 72 between the ends of said arm 70. One end of the arm 70 is provided with a hook portion 71 which cooperates with the pin 68 to prevent upward reciprocation of the tube 41. As shown more clearly in FIGURE 2, a spring 74 extends between a guide support for the tow pin 44 and a collar 76 on tube 41. The spring 74 tends to bias the tube 41 and tow pin 44 upwardly in FIGURE 2. Such upward bias is resisted by the engagement between the pin 68 and the hook portion 71.

Any convenient means (not shown) may be provided to limit the upward movement of the tow pin 44 in response to the biasing effect of the spring 74. By a proper choice of spring, the need for a limiting stop may be avoided. A ring 80 is fixedly secured to the arm 70. A rod 82 extends through a hole in the ring 80. As illustrated, the diameter of the hole in the ring 80 is substantially larger than the diameter of the rod 82. The ends of the rod 82 are received within bushings 84 on the members 54 and 58. Each bushing 84 is provided with an internal diameter substantially larger than the diameter of the rod 82. The choice of diameters for the holes in the ring 80 and the bushings 84 requires both ends of the rod 82 to move in the same direction at the same time in order for the rod 82 to cause the arm 70 to pivot about the pivot pin 72.

The truck 20 is provided with a rigidly supported pushing bumper 86 extending across the front portion thereof. A front accumulation bumper 88 is provided in front of and below the bumper 86. The ends of the bumper 88 are rotatably supported by a pair of brackets 90 and 92 which depend from the base 22 on opposite sides thereof.

One end of a link 94 is rotatably connected to a rear surface on the bumper 88. The other end of the link 94 is rotatably connected to one end of a tubular shaft 96. The link 94 is provided with a cam 95 which raises roller 97 and pin 44 when link 94 reciprocates to the right in FIGURE 2. One end of a connecting rod 98 is telescopically disposed within the other end of the shaft 96 and a spring 100 extends between a collar on said rod and the adjacent end of the tubular shaft 96. Thus, the tubular shaft 96 and the rod 98 are interconnected by means of the resilient spring 100.

The other end of the rod 98 is rotatably connected to a link 104. One end of the link 104 is rotatably supported by the base 22. The free end of the link 104 is adapted to cooperate with the rear bumper 106 to convert the rear bumper 106 into an accumulation bumper.

The rear bumper 106 comprises a pair of spaced substantially parallel side braces 108 (only one shown in FIGURE 2), interconnected at one end of an angle iron 109. The side braces 108 are also interconnected at their other ends by an angle iron 112. Each side brace 108 is provided with an ear 110 rotatably supported by the base 22 and has a normal disposition as illustrated in FIGURE 2.

The angle iron 112 is disposed with its arms at an angle with respect to the horizontal as illustrated in FIGURE 2. Angle iron 112 is adapted to cooperate with the link 104 to prevent rotation of the rear bumper 106 thereby converting said rear bumper into an accumulation pumper. In the disposition of the elements as illustrated in FIGURE 2, the bumper 106 is readily rotatable and therefore offers no resistance when contacted by another truck 20. It will be noted that the distance of the angle iron 109 from the floor 12 corresponds with the distance between the floor 12 and the accumulation bumper 88. Thus, the rear bumper 106 is adapted to be contacted by the accumulation bumper on another truck similar to truck 20.

A brake shoe 114 is fixedly secured to one end of a lever 116. The other end of the lever 116 is rotatably connected to the connecting rod 98. The lever 116 is rotatably supported about a pin intermediate its extremities. The brake shoe 114 is adapted to contact the rear wheel 26 to halt rotation of the same. Hereinafter, link 90, shaft 96, rod 98 and lever 116 may be referred to as a linkage interconnecting said brake shoe and said front accumulation bumper so that said brake shoe engages a rear wheel in response to rotary movement of the front accumulation bumper.

The main slot 14 and the various shunt slots in the floor 12 will be defined by a metallic element disposed therein. A tow chain 118 is disposed within the main slot 14 and is provided with dogs 120 at spaced points therealong. In the lowermost disposition of the tow pin 44, the lowermost end of the tow pin 44 is adapted to contact the dog 120 and thereby enable the truck 20 to be propelled alog the main slot 14. A pair of abutments 122 and 124 are located on the floor 12 on opposite sides of the main slot 14 adjacent the intersection of the main slot 14 and the shunt slot 16. Similar abutments will be provided adjacent the intersection of the main slot 14 and each of the shunt slots intersecting therewith.

A switch plate 126 is supported below the level of floor 12 at the intersection of the shunt slot 16 in the main slot 14. The switch plate 126 is provided with cam surfaces in a plurality of horizontal planes. Thus, the switch plate 126 is provided with a cam surface 128 adapted to be contacted by the tow pin 44 when said tow pin 44 is in its lowermost disposition. The switch plate 126 is also provided with a cam surface 130 in a higher plane for contact with the tow pin 44 when said tow pin 44 is out of engagement with the dog 120. The switch plate 126 is mounted for rotary movement by a pivot pin 132 and is spring biased to the disposition illustrated in FIGURE 4 by means of spring 134.

The operation of the tow truck system 10 is as follows:

The truck 20 may be in any particular area of a building which for example may be a loading area. While at this location, the handle 42 will be in one of the notches 40 so that the lowermost end of the tow pin 44 will be spaced from the floor 12. When the truck 20 has been loaded, the operator will choose the particular area and shunt slot to which it is desired to dispatch the truck 20. For purposes of illustration, it will be assumed that shunt slot 16 is the shunt slot leading to the selected area.

In order to dispatch the truck 20 to the selected area, the operator positions the trip rods 64 and 66 in the aligned holes of the members 54 and 58 in the position illustrated in FIGURES 1 and 3. Thereafter, the truck 20 will be manually pushed to a position so as to assume a disposition over the main slot 14 as illustrated in FIGURE 1. Then the handle 42 will be manually rotated and pushed downwardly so as to compress the spring 74. While the spring 74 is in its compressed disposition, the hook portion 71 will be manipulated so as to extend over the pin 68 as illustrated in FIGURES 1–3. Thereafter, the next dog on the continuously moving tow chain 118, which may be dog 120, contacts the lowermost end of the tow pin 44 thereby causing the truck 20 to be propelled along the main slot 14.

As the truck 20 approaches the intersection of the shunt slot 16 and the main slot 14, the trip rods 64 and 66 are in alignment with the abutments 124 and 122, respectively. Thus, the trip rods simultaneously engage the abutments. The simultaneous engagement of the trip rods 64 and 66 with the abutments 124 and 122, respectively, causes the rod 82 to pivot the arm 70 about pin 72. As the arm 70 pivots from the disposition illustrated in FIGURES 1–3, the hook portion 71 clears the pin 68 and the spring 74 biases the tow pin 44 upwardly out of engagement with the dog 120.

Thereafter, the lowermost end of the tow pin 44 lies in a plane wherein it abuts against the cam surface 130 thereby directing the tow pin 44 and the truck 20 along the shunt slot 16. If shunt slot 16 were not the pre-selected shunt slot, the lowermost end of the tow pin 44 would remain in contact with the dog 120 and be capable of engaging the cam surface 128 thereby camming the switch plate 126 to the disposition illustrated in FIGURE 5. As illustrated in FIGURE 5, the switch plate 126 has been cammed to a position wherein one of its edges forms a continuation of the main slot 14.

If the shunt slot 16 were not the pre-selected shunt slot, only one or neither of the trip rods 64 and 66 would be deflected by engagement with an abutment. Accordingly, both ends of the rod 82 would not be caused to move in the same direction at the same time. Under such circumstances, only one end of the rod 82 will be moving in a forward direction while pivoting around its other end. Therefore, the rod 82 will not contact the ring 80 to cause the arm 70 to pivot about pin 72.

In order to prevent trucks from rolling backward when they are disengaged with respect to the tow line due to a jam up of trucks, a means is provided to apply the brakes on the trucks. Such means includes the accumulation bumper 88 which is caused to pivot in a clockwise direction as shown in FIGURE 2 upon contact with the rear bumper of another truck or some other obstruction. Such pivotable movement of the bumper 88 applies the brakes on the truck 20 and converts the rear bumper 106 into an accumulation bumper. Hereinafter, link 94, shaft 96, rod 98 and link 104 may be referred to as a linkage interconnecting said bumpers so that said rear bumper is converted to an accumulation bumper in response to movement of said front bumper. Occasionally, a truck does not travel along the pre-selected shunt slot for a sufficient distance so as to provide a clear path along the main slot 14 for the next truck. In this case, the bumper 86 on the truck 20 will contact a rear surface on the base of such truck and physically push the same along its shunt slot.

When the accumulation bumper 88 is caused to rotate in a clockwise direction in FIGURE 2, the link 94 moves thereby camming the tow pin 44 upwardly so that its lowermost end is out of contact with the dog on the tow chain 118. Simultaneously, the tubular shaft 96 causes the rod 98 to reciprocate to the right in FIGURE 2. Reciprocation of the rod 98 to the right in FIGURE 2 causes contact between the brake shoe 114 and the rear wheel 26. Also, such movement of the rod 98 causes the link 104 to assume the phantom position illustrated in FIGURE 2 thereby preventing clockwise rotation of the rear bumper 106.

It will be apparent that the brake shoe 114 remains in engagement with the rear wheels of the truck 20 and that the tow pin 44 remains in an intermediate position so as to be clear of the dogs on the tow line 118 when the accumulation bumper 88 has been biased to the right in FIGURE 2. Thus, the truck 20 will remain in this position until the truck or other obstacle in front thereof has been removed. In this position of the elements of the truck 20, it should be noted that the rear bumper 106 is disposed so as to act as an accumulation bumper, thereby causing the accumulation bumper on the front of the vehicle following truck 20 to be activated and likewise control the elements on such truck in the same manner.

It will be noted that the shunt slots 16 and 18 extend from the main slot 14 on opposite sides thereof. The number of shunt slots with which the truck 20 may be utilized may be determined as follows: The minimum number of shunt slots is one. The maximum number of shunt slots with which the truck 20 may be utilized is the number of aligned holes 62 on the member 54 multiplied by the number of aligned holes 62 on the member 58.

As shown more clearly in FIGURES 6–8, there is shown another embodiment of the present invention designated generally as 10'. The tow truck system 10' is identical with the tow truck system 10 except as will be made clear hereinafter. Accordingly, like elements are provided with primed corresponding numerals and need not be described in detail.

In the tow truck system 10', the shunt slots 16' and 18' do not intersect the main slot 14' and are disposed on the same side of the main slot 14'. As shown more clearly in FIGURE 6, each of the shunt slots 16' and 18' are provided with a short portion which is substantially parallel to the main slot 14'. The truck 20' is provided with a reciprocally mounted vertically disposed auxiliary tow pin 140. Arm 70' is secured to member 54' which extends across the front of the truck 20'.

The auxiliary tow pin 140 is interconnected with the tube 41' by means of a link 142. The link 142 is rotatably mounted about a pivot pin substantially equidistant from its ends. The link 142 is provided with elongated slots on opposite sides of its pivot pin. A pin 144 on the tube 41' extends through one of the elongated slots. A pin 146 on the auxiliary tow pin 140 extends through the other of the elongated slots on the link 142.

Thus, it will be seen that the auxiliary tow pin 140 is caused to move downwardly so that its lowermost end enters one of the shunt slots when the tube 41' and tow pin 44' are raised due to its spring bias.

The front accumulation bumper 88' is structurally interrelated with the shaft 96' in substantially the same manner as described above. The tubular shaft 96' is guided by brackets 99 and 101 as shown more clearly in FIGURE 7. A spring 100' extends between the bracket 101 and a collar on shaft 96' thereby biasing shaft 96' to the left in FIGURE 7. The free end of the shaft 96' is rotatably connected to an arm 158. A brake shoe 160 is secured to one end of the arm 158. The arm 158 is rotatably mounted about a pivot pin secured to a bottom surface of the base 22'.

A link 104' has one end rotatably connected to the base 22'. A spring 162 tends to bias the link 104' to the phantom position illustrated in FIGURE 7. In such phantom position, the link 104' converts the rear bumper 106' into a pushing bumper since it will offer resistance when contacted by bumper 86' of the next truck therebehind. A cable 164 is connected at one end to the link 104'. The other end of the cable 164 is connected to the link 142. With the tow pin 44' and the auxiliary tow pin 140 in the position illustrated in FIGURE 6, the cable 164 is tensioned and opposes the bias of spring 162.

The operation of the tow truck system 10' is substantially identical with the description set forth above in regard to the tow truck system 10. Assuming that shunt slot 16' is the preselected shunt slot, the elements of the tow truck 20' remain as shown in FIGURE 6. When the trip rod 64' engages the abutment 124', the member 54' and the arm 70' rotate, thereby enabling the tow pin 44' and the tube 41' to be moved upwardly under a spring bias. As the tube 41' moves upwardly, the link 142 causes the auxiliary tow pin 140 to move downwardly into the shunt slot 16'.

As the auxiliary tow pin 140 moves downwardly, the cable 164 is slackened. The slack in the cable 164 enables the spring 162 to rotate the link 104' to the phantom position illustrated in FIGURE 7. The significance of the phantom position of the link 104' should be clear from the description set forth above.

When the accumulation bumper 88' is caused to rotate in a clockwise direction in FIGURE 7, cam 95' reciprocates the tow pin 44' upwardly. At the same time, the tubular shaft 96' reciprocates to the right in FIGURE 7 thereby causing the brake shoe 160 to engage the rear wheel 26'.

Since the shunt slots 16' and 18' do not intersect the main slot 14', the tow truck system 10' does not utilize a switch plate such as switch plate 126. Thus, it will be seen that the tow truck system 10' has all the advantages of the tow truck system 10. In each of the systems 10 and 10', the truck is provided with a front accumulation bumper and a selectively convertible rear bumper. In each system, the rear bumper is converted into an accumulation or pushing bumper in response to actuation of the front accumulation bumper. The rear bumper 106' is converted into a pushing bumper when the truck 20' is switched to a shunt slot.

FIGURE 12 illustrates the rear end of a truck which is identical with truck 20' except as will be made clear hereinafter. In FIGURE 12, the cable 164 is eliminated and the link 170 is biased to the position shown by spring 162. The shaft 96' has an arm 172 which is adapted to oppose the bias of spring 162 and rotate link 170. Arm 172 has a bifurcation 174 at one end which receives pin 176 on link 170. The other end of arm 172 is interconnected with shaft 96'. Hence, the bumper 106' in this embodiment will always be a pushing bumper except when the shaft 96' reciprocates to the right in FIGURE 12 due to rotary movement of bumper 88' in a clockwise direction in FIGURE 7. Other equivalent devices may be substituted for arm 172.

In each embodiment, the tow pin will remain in a raised position due to cam 95 and 95' so long as the front accumulation bumper remains in contact with an obstruction. As soon as the front accumulation bumpers resume their normal position as illustrated, the tow pin will descend to a position so that it will be contacted by the next dog on the tow line and the brakes, if any, will be released. Hence, the trucks will automatically continue along the main slot in response to a removal of an obstruction.

In FIGURES 9–11, there is disclosed a safety overload prevention device which may be used with either system 10 or 10'. For purposes of illustration, the overload prevention device will be explained in conjunction with system 10.

The safety overload prevention device, designated generally as 130', is positioned along the shunt slots such as slot 16. The location of device 130' along the slot 16 depends on the number of trucks which one desires to divert into slot 16. When the desired number of trucks have been diverted into slot 16, device 130' automatically prevents additional trucks from entering the same.

The device 130' includes a contact plate 132' pivotably supported by a parallelogram support 134'. The plate 132' is connected to the abutment 136 by a flexible member such as wire 138. The abutment 136 is pivotably mounted as illustrated in FIGURE 10. When truck 140 enters slot 16, it will be the last truck which may enter slot 16 since the first truck will be in a position so that its tow pin maintains the plate 132' in the phantom position shown in FIGURE 9.

When plate 132' is in its phantom position in FIGURE 9, abutment 136 assumes the phantom position in FIGURE 10. Thereafter, the abutment 136 will be incapable of cooperating with a trip rod positioned on trucks 142 and 144 which would ordinarily be diverted along shunt slot 16. Hence, trucks 142 and 144 will continue under the influence of the tow line and recycle past abutment 136 continuously until slot 16 is no longer overloaded.

The present invention may be embodied in other specific forms without departing from the spirit or essential attributes thereof and, accordingly, reference should be made to the appended claims, rather than to the foregoing specification as indicating the scope of the invention.

We claim:
1. A tow truck system comprising means defining a main slot, a truck mounted for movement along said main slot by means of engagement between a tow pin on said truck and a portion of a tow line, the direction of said tow line corresponding to the direction of said main slot, a rotatably mounted accumulation bumper on a front portion of said truck, a movable rear bumper mounted on a rear portion of said truck, and means structurally interconnecting said front bumper with said rear bumper so that said rear bumper may be selectively rendered immobile in response to rotary movement of said front bumper.

2. A tow truck system in accordance with claim 1 including means for biasing said tow pin out of engagement with said portion of said tow line in response to rotary movement of said front accumulation bumper toward said rear bumper.

3. A tow truck system in accordance with claim 1 including means responsive to movement of said last mentioned means for causing engagement between a brake shoe and a rear wheel of said truck in response to said movement of said front accumulation bumper.

4. A tow truck system in accordance with claim 1 wherein said tow pin is biased in a direction away from said main slot, a rotatably mounted arm structurally interrelated with said tow pin for opposing the bias on said tow pin, and selectively operable trip rod means on said truck and structurally interrelated with said arm for selectively rotating said arm to a position wherein it no longer opposes the bias on said tow pin.

5. A tow truck for use in a tow truck system wherein the truck will be mounted for movement in the direction of a main slot comprising a base mounted on wheels, an upright portion on the front end of said base, an upright tow pin supported for reciprocatory movement by said upright portion, said tow pin being adapted to enter the main slot, means biasing said tow pin upwardly in a direction substantially perpendicular to the plane of said base, a selectively operable means supported by said base for selectively opposing the bias on said tow pin, and a trip rod movably supported by said base, said trip rod being structurally interrelated with said last mentioned means so that actuation of said last mentioned means is responsive to movement of said trip rod.

6. A truck in accordance with claim 5 wherein said selectively operable means includes a rotatably mounted arm, a hook portion on said arm engaging a member associated with said tow pin, a second trip rod supported by said base, and rotary movement of said arm being responsive to simultaneous actuation of said trip rods, whereby said hook portion may be disengaged from said member.

7. A truck in accordance with claim 5 wherein said selectively operable means includes a pair of rotatably mounted elongated members supported by said base on opposite sides of said tow pin, each elongated member including means accommodating one of said trip rods in one of a plurality of predetermined spaced positions along its length, whereby the minimum number of different positions of said rods equals the number of positions on one of said elongated members, and the maximum number of different relative positions of said rods equals the product of the number of trip rod positions on one elongated member and the number of trip rod positions on the other elongated member.

8. A truck in accordance with claim 5 including a rotatably mounted accumulation bumper supported by said base in front of said upright portion, and means for causing movement of said tow pin in an upward direction when said bumper is rotated toward said upright portion.

9. A truck in accordance with claim 8 including a movable rear bumper rotatably mounted on the rear end of said base, and linkage interconnecting said bumpers so that said rear bumper is converted to an accumulation bumper in response to said movement of said front accumulation bumper.

10. A truck comprising a base mounted on wheels, a front accumulation bumper rotatably mounted on one end of said base for movement between an operative and an inoperative disposition, a tow pin movably supported by said one end of said base and adapted to engage a means for propelling said base, a rear bumper movably mounted on the other end of said base, linkage interconnecting said bumpers so that movement of said accumulation bumper to its operative disposition causes said rear bumper to be converted into an accumulation bumper, and means responsive to said movement for moving said tow pin in an upward direction when said front accumulation bumper is in said operative disposition so that said base is no longer propelled.

11. A truck comprising a base mounted on wheels, a reciprocally mounted tow pin on a front portion of said base, an axialiary tow pin mounted on said front portion of said base, said auxiliary tow pin being mounted for reciprocatory movement in a direction substantially parallel to and spaced from said tow pin, linkage interconnecting said tow pins so that said auxiliary tow pin moves downwardly when said tow pin moves upwardly, a rear bumper on said base, and means for converting said rear bumper into a pushing bumper in response to a downward movement of said auxiliary tow pin.

12. A truck in accordance with claim 11 wherein said means including a rotatably mounted link supported on said base, a spring biasing said link into engagement with said rear bumper, and a flexible member connected to said link for opposing the bias of said spring except when said auxiliary tow pin moves in said downward direction.

13. A truck in accordance with claim 12 including a rotatably mounted accumulation bumper on a front end of said base, and selectively operable means on said base for providing upward movement on said tow pin and downward movement of said auxiliary tow pin in response to rotary movement of said front accumulation bumper.

14. A truck in accordance with claim 13 including a brake shoe supported adjacent a rear wheel on said base, and linkage interconnecting said brake shoe and said front accumulation bumper so that brake shoe engages said rear wheel in response to rotary movement of said front accumulation bumper.

15. A tow truck system comprising means defining a main slot, means defining a plurality of shunt slots disposed at spaced points along said main slot and extending in a direction away from said main slot, a truck mounted for movement along said main slot by means of engagement between a tow pin on said truck and a portion of a tow line, the direction of said tow line corresponding to the direction of said main slot, means for switching said truck from movement along said main slot to movement along a predetermined one of said shunt slots, a spring means biasing said tow pin in a direction away from and substantially perpendicular to the plane of said slots, and said switching means including a member opposing the bias on said tow pin, a rear bumper on said truck, a means on said truck responsive to movement of said tow pin in a direction away from said slot for converting said rear bumper into a pushing bumper.

16. A tow truck system comprising means defining a main slot, means defining a plurality of shunt slots disposed at spaced points along said main slot and extending in a direction away from said main slot, a truck mounted for movement along said main slot by means of engagement between a tow pin on said truck and a portion of a tow line, the direction of said tow line corresponding to the direction of said main slot, means for switching said truck from movement along said main slot to movement along a predetermined one of said shunt slots, a spring means biasing said tow pin in a direction away from and substantially perpendicular to the plane of said slots, and said switching means including a member opposing the bias on said tow pin, a rear bumper on said truck, means for selectively converting said rear bumper to a pushing bumper, said last mentioned means including a cable responsive to downward movement of said auxiliary tow pin.

17. A tow truck system comprising means defining a main slot, means mounting a truck for cooperation with and movement along said main slot in a manner so that said truck will be guided by said main slot, a shunt slot, means for switching said truck from movement along said main slot to movement along said shunt slot, and an overload prevention device structurally interrelated with said shunt slot and switching means for preventing more than a predetermined number of trucks from accumulating along said shunt slot.

18. A system in accordance with claim 17 wherein said device is structurally interrelated with said switching means in a manner so that said switching means is disabled when said predetermined number of trucks have been accumulated along said shunt slot.

19. A tow truck comprising a mobile truck base, a movable guide supported by the base, an upright tow pin extending through the guide and movable with respect thereto, a limit stop on said pin, said pin being gravity biased to a first position wherein said limit stop engages said guide, spring means biasing said guide upwardly, movable means on said base selectively opposing said bias on said guide, said spring means biasing said guide and pin upwardly so that said pin assumes a second position when said movable means is ineffective to oppose said bias on said guide, and an accumulation bumper movably supported on said base, said bumper being coupled with said pin in a manner wherein said bumper causes said pin to move upwardly to a third position in response to movement of said bumper, whereby said pin is adapted to engage a propelling means while in its first position and return to its first position from its third position when said bumper is no longer capable of maintaining said pin in its third position.

20. A truck in accordance with claim 19 including a selectively positionable trip rod supported by said base, said rod being structurally interrelated with said movable means in a manner wherein said movable means is responsive to actuation of said trip rod.

21. A truck comprising a base mounted on wheels, a front accumulation bumper rotatably mounted on one end of said base for movement between an operative and an inoperative disposition, a tow pin movably supported by said one end of said base and adapted to engage a means for propelling said base, a rear bumper movably mounted on the other end of said base, at least one movable element coupled to said rear bumper and rendering said rear bumper immobile, linkage interconnecting said front accumulation bumper and said element so that movement of said front accumulation bumper to its operative disposition prevents said elements from rendering said rear bumper immobile, whereby said rear bumper is an accumulation bumper when said front accumulation bumper is in its operative disposition, and means responsive to movement of said front accumulation bumper for moving said tow pin in an upward direction when said front accumulation bumper is in said operative disposition so that said base is no longer propelled.

References Cited in the file of this patent
UNITED STATES PATENTS

| | | |
|---|---|---|
| 2,619,370 | Leger | Nov. 25, 1952 |
| 2,871,799 | King | Feb. 3, 1959 |
| 2,936,718 | Bradt et al. | May 17, 1960 |
| 2,936,719 | Rodd | May 17, 1960 |
| 3,015,284 | Klamp | Jan. 2, 1962 |